(12) United States Patent
Levanon et al.

(10) Patent No.: US 10,356,211 B2
(45) Date of Patent: Jul. 16, 2019

(54) OPTIMIZED IMAGE DELIVERY OVER LIMITED BANDWIDTH COMMUNICATION CHANNELS

(71) Applicant: Bradium Technologies LLC, Suffern, NY (US)

(72) Inventors: Isaac Levanon, Raanana (IL); Yonatan Lavi, Raanana (IL)

(*) Notice: Subject to any disclaimer, the term of this patent is extended or adjusted under 35 U.S.C. 154(b) by 27 days.

(21) Appl. No.: 15/687,513

(22) Filed: Aug. 27, 2017

(65) Prior Publication Data

US 2018/0084082 A1 Mar. 22, 2018

Related U.S. Application Data

(63) Continuation of application No. 15/457,816, filed on Mar. 13, 2017, which is a continuation of application
(Continued)

(51) Int. Cl.
*H04L 29/08* (2006.01)
*G06F 3/14* (2006.01)
(Continued)

(52) U.S. Cl.
CPC .............. *H04L 67/327* (2013.01); *G06F 3/14* (2013.01); *G06F 3/1454* (2013.01);
(Continued)

(58) Field of Classification Search
CPC ... G06F 17/30061; G06T 1/20; G06T 15/005; G06T 1/60; G06T 11/60; G06T 15/20; G06T 2207/10028; G06T 2207/10032; G06T 17/005; G06T 2210/36; G06T 2210/56; G06T 7/11; G06T 7/20;
(Continued)

(56) References Cited

U.S. PATENT DOCUMENTS 4,222,076 A 9/1980 Knowlton
4,698,689 A 10/1987 Tzou
(Continued)

FOREIGN PATENT DOCUMENTS

EP 1070290 B1 1/2015

OTHER PUBLICATIONS

Reddy et al. "TerraVision II: Visualizing Massive Terrain Databases in VRML" IEEE Mar./Apr. 1999 (Year: 1999).*
(Continued)

*Primary Examiner* — David R Lazaro

(57) ABSTRACT

Large-scale images are retrieved over network communications channels for display on a client device by selecting an update image parcel relative to an operator controlled image viewpoint to display via the client device. A request is prepared for the update image parcel and associated with a request queue for subsequent issuance over a communications channel. The update image parcel is received from the communications channel and displayed as a discrete portion of the predetermined image. The update image parcel optimally has a fixed pixel array size, is received in a single and or plurality of network data packets, and were the fixed pixel array may be constrained to a resolution less than or equal to the resolution of the client device display.

14 Claims, 5 Drawing Sheets

Related U.S. Application Data

No. 15/343,052, filed on Nov. 3, 2016, now Pat. No. 9,635,136, which is a continuation of application No. 15/281,037, filed on Sep. 29, 2016, now Pat. No. 9,641,645, which is a continuation of application No. 14/970,526, filed on Dec. 15, 2015, now Pat. No. 9,641,644, which is a continuation of application No. 14/547,148, filed on Nov. 19, 2014, now Pat. No. 9,253,239, which is a continuation of application No. 13/027,929, filed on Feb. 15, 2011, now Pat. No. 8,924,506, which is a continuation-in-part of application No. 12/619,643, filed on Nov. 16, 2009, now Pat. No. 7,908,343, which is a continuation of application No. 10/035,987, filed on Dec. 24, 2001, now Pat. No. 7,644,131.

(60) Provisional application No. 60/258,465, filed on Dec. 27, 2000, provisional application No. 60/258,466, filed on Dec. 27, 2000, provisional application No. 60/258,467, filed on Dec. 27, 2000, provisional application No. 60/258,468, filed on Dec. 27, 2000, provisional application No. 60/258,488, filed on Dec. 27, 2000, provisional application No. 60/258,489, filed on Dec. 27, 2000.

(51) Int. Cl.
| | | |
|---|---|---|
| *G06T 3/40* | (2006.01) | |
| *H04L 29/06* | (2006.01) | |
| *G09G 5/00* | (2006.01) | |
| *G06F 17/24* | (2006.01) | |
| *G06T 11/60* | (2006.01) | |
| *G06T 19/00* | (2011.01) | |
| *G06T 15/04* | (2011.01) | |

(52) U.S. Cl.
CPC .......... *G06F 17/241* (2013.01); *G06T 3/4092* (2013.01); *G06T 11/60* (2013.01); *G06T 19/003* (2013.01); *G09G 5/003* (2013.01); *H04L 65/602* (2013.01); *H04L 67/42* (2013.01); *G06T 15/04* (2013.01); *G06T 2207/10032* (2013.01); *G09G 2340/02* (2013.01); *G09G 2350/00* (2013.01); *G09G 2370/02* (2013.01); *G09G 2370/16* (2013.01)

(58) Field of Classification Search
CPC .......... G06T 7/74; G06T 15/04; G06T 15/10; G06T 17/05; G06T 19/00; G06T 19/003; G06T 19/006; G06T 2200/04; G06T 2200/24; G06T 2207/10024; G06T 2207/20081; G06T 3/40; G06T 3/4092; G06T 7/0012; G06T 7/12; G06T 7/174; G06T 11/00; G06T 11/005; G06T 11/008; G06T 11/206; G06T 15/00; G06T 15/06; G06T 15/08; G06T 15/205; G06T 17/00; G06T 17/20; G06T 19/20; G06T 1/00; G06T 1/0007; G06T 2200/28; G06T 2207/10004; G06T 2207/10012; G06T 2207/10016; G06T 2207/10021; G06T 2207/20016; G06T 2207/30048; G06T 2207/30192; G06T 2207/30201; G06T 2207/30204; G06T 2207/30241; G06T 2207/30244; G06T 2207/30252; G06T 2207/30261; G06T 2210/12; G06T 2210/22; G06T 2210/41; G06T 2210/52; G06T 2219/024; G06T 3/0062; G06T 3/0068; G06T 3/4038; G06T 3/60; G06T 5/006; G06T 5/20; G06T 7/00; G06T 7/0004; G06T 7/0042; G06T 7/0071; G06T 7/246; G06T 7/251; G06T 7/292; G06T 7/30; G06T 7/40; G06T 7/408; G06T 7/50; G06T 7/579; G06T 7/593; G06T 7/596; G06T 7/60; G06T 7/70; G06T 7/73; G06T 7/97; G06T 9/005; H04L 67/327; H04L 67/02; H04L 67/1014; H04L 67/42; H04L 63/08; H04L 63/0861; H04L 65/602; H04L 67/10; H04L 67/1097; H04L 67/12; H04L 12/1813; H04L 12/1895; H04L 12/2881; H04L 12/413; H04L 12/4625; H04L 12/4633; H04L 12/58; H04L 2209/16; H04L 29/06; H04L 29/08729; H04L 29/08891; H04L 41/044; H04L 41/046; H04L 41/0896; H04L 41/142; H04L 43/04; H04L 43/06; H04L 43/08; H04L 43/0894; H04L 47/20; H04L 47/2441; H04L 49/104; H04L 51/00; H04L 51/18; H04L 51/32; H04L 61/2007; H04L 63/083; H04L 63/0876; H04L 63/10; H04L 63/1425; H04L 63/168; H04L 65/403; H04L 65/4084; H04L 67/06; H04L 67/08; H04L 67/1002; H04L 67/1008; H04L 67/1038; H04L 67/1072; H04L 67/1095; H04L 67/141; H04L 67/22; H04L 67/2814; H04L 67/2842; H04L 67/2885; H04L 67/36; H04L 69/14; H04L 9/0822; H04L 9/085; H04L 9/3271

See application file for complete search history.

(56) References Cited

U.S. PATENT DOCUMENTS

| | | | |
|---|---|---|---|
| 4,972,319 A | 11/1990 | Delorme | |
| 5,167,035 A * | 11/1992 | Mann | H04L 29/00 370/250 |
| 5,682,441 A | 10/1997 | Ligtenberg et al. | |
| 5,721,956 A * | 2/1998 | Martin | G06F 3/0613 348/E7.073 |
| 5,760,783 A | 6/1998 | Migdal et al. | |
| 5,764,915 A * | 6/1998 | Heimsoth | H04L 29/06 709/227 |
| 5,940,117 A | 8/1999 | Hassan et al. | |
| 5,956,039 A | 9/1999 | Woods et al. | |
| 5,965,039 A | 10/1999 | Kitahashi et al. | |
| 5,987,256 A | 11/1999 | Wu et al. | |
| 6,118,456 A | 9/2000 | Cooper | |
| 6,119,179 A | 9/2000 | Whitridge et al. | |
| 6,121,970 A * | 9/2000 | Guedalia | G06F 3/14 715/234 |
| 6,169,549 B1 | 1/2001 | Burr | |
| 6,182,114 B1 | 1/2001 | Yap et al. | |
| 6,266,322 B1 * | 7/2001 | Berger | H04L 41/0896 370/229 |
| 6,266,701 B1 * | 7/2001 | Sridhar | H04L 29/12066 370/465 |
| 6,282,490 B1 * | 8/2001 | Nimura | G01C 21/367 340/990 |
| 6,317,137 B1 | 11/2001 | Rosasco | |
| 6,396,503 B1 * | 5/2002 | Goss | G06T 15/04 345/422 |
| 6,401,113 B2 | 6/2002 | Lazaridis et al. | |
| 6,492,985 B1 * | 12/2002 | Mutz | G06F 3/04815 345/419 |
| 6,650,998 B1 | 11/2003 | Rutledge et al. | |
| 6,728,960 B1 | 4/2004 | Loomans | |
| 6,985,455 B1 * | 1/2006 | Heath | H04B 7/1858 370/316 |
| 7,139,794 B2 | 11/2006 | Levanon et al. | |

(56) References Cited

U.S. PATENT DOCUMENTS

| | | | | |
|---|---|---|---|---|
| 7,324,228 | B2* | 1/2008 | Chiarabini | G06F 3/1204 358/1.13 |
| 7,561,156 | B2 | 7/2009 | Levanon et al. | |
| 7,644,131 | B2* | 1/2010 | Levanon | G06F 3/14 345/625 |
| 7,908,343 | B2 | 3/2011 | Levanon et al. | |
| 8,868,313 | B2 | 10/2014 | Asti | |
| 8,924,506 | B2* | 12/2014 | Levanon | G06F 3/1454 709/217 |
| 8,924,596 | B1 | 12/2014 | Beeson et al. | |
| 9,253,239 | B2 | 2/2016 | Levanon et al. | |
| 9,635,136 | B2 | 4/2017 | Levanon et al. | |
| 9,641,644 | B2* | 5/2017 | Levanon | G06F 3/1454 |
| 9,641,645 | B2 | 5/2017 | Levanon et al. | |
| 2002/0080168 | A1* | 6/2002 | Hilliard | G06F 3/14 715/744 |
| 2002/0085219 | A1* | 7/2002 | Ramamoorthy | G06T 15/10 358/1.9 |
| 2002/0112237 | A1* | 8/2002 | Kelts | G06F 3/0481 725/39 |
| 2002/0138618 | A1* | 9/2002 | Szabo | H04L 12/26 709/225 |
| 2004/0210586 | A1* | 10/2004 | Birdwell | G06F 17/3028 |
| 2006/0080306 | A1* | 4/2006 | Land | G06F 17/30265 |
| 2008/0294332 | A1 | 11/2008 | Levanon et al. | |

OTHER PUBLICATIONS

Letter from J. Lasker to M. Shanahan, Dec. 8, 2016.
Letter from L. Merken to M. Shanahan, Jan. 20, 2017.
Letter from L. Merken to M. Shanahan, Apr. 4, 2017.
Letter from J. Lasker to M. Shanahan, Nov. 30, 2017.
Letter from J. Lasker to M. Shanahan, May 4, 2018.
Internet Imaging Protocol, Version 1.0.5, Oct. 6, 1997; 12;19pm, R18, Hewlett Packard Company, Live Picture, Inc. and Eastman Kodak Company.
FlashPix Format Specification, Version 1.0, Sep. 11, 1996, Eastman Kodak Company.
FlashPix Format and Architecture White Paper, Jun. 17, 1996, Eastman Kodak Company.
IPR2016-01897, Exhibit 1030. Declaration of Isaac Levanon (Isaac Decl.)—Public Version.
IPR2016-01897, Exhibit 1032. Substitute statement in lieu of oath or declaration.
IPR2016-01897, Exhibit 1033. Coulson emails to Lavi_REDACTED.
IPR2016-01897, Exhibit 1036. Correspondence Y. Lavi and E. Day_Redacted.
IPR2016-01897, Exhibit 1039. Jul. 11, 1017 ltr to Yonatan Lavi fr Matt Bernstein.
IPR2016-01897, Exhibit 1046. Correspondence E. Day and C. Coulson.
IPR2016-01897, Exhibit 2002. Declaration of Mr. Isaac Levanon.
IPR2016-01897, Exhibit 2003. Declaration of Dr. Peggy Agouris.
IPR2016-01897, Exhibit 2014. Declaration of Dr. Peggy Agouris.
IPR2017-01616. 644 Petition for Inter Partes Review.
IPR2017-01616. Joint Motion to Terminate.
IPR2017-01616, Exhibit 1005. Michalson Declaration (Appendices A-S).
IPR2017-01616, Exhibit 1005. Michalson Declaration (Appendices T-NN).
IPR2017-01817. 136 Petition for Inter Partes Review.
IPR2017-01817. Joint Motion to Dismiss.
IPR2017-01817, Exhibit 1005. 136 Michalson Declaration (Appendices A-S).
IPR2017-01817, Exhibit 1005. 136 Michalson Declaration (Appendices T-NN).
IPR2017-01817, Exhibit 1016. 136 File History.
IPR2017-01817, Exhibit 1045. Excerpts from Microsoft Dictionary.
IPR2017-01817, Exhibit 1050. Thinkpad X PR.
IPR2017-01817, Exhibit 1051. RangeLAN2 PC Card (WinCE Handhelds).
IPR2017-01817, Exhibit 1052. Cisco Aironet 340 Series Brochure.
IPR2017-01817, Exhibit 1073. Bing Tile Maps.
IPR2017-01818. 645 Petition for Inter Partes Review.
IPR2017-01818. Joint Motion to Dismiss.
IPR2017-01818, Exhibit 1005. 645 Michalson Declaration (Appendices A-S).
IPR2017-01818, Exhibit 1005. 645 Michalson Declaration (Appendices T-NN).
IPR2017-01818, Exhibit 1009. Cover page and auth declaration of Reddy (Ex1004) from British Library.
IPR2017-01818, Exhibit 1014. Visualization System for SRIs Digital Earth Proposal, dated Apr. 16, 1999.
IPR2017-01818, Exhibit 1016. 645 File History.
IPR2017-01818, Exhibit 1019. Isaac Levanon Deposition Transcript—with errata sheet.
IPR2017-01818, Exhibit 1023. Bubba "Masterfung" Wolford, FXT1_3dfx Texture Compression. http://www.combatsim.com/htm/sept99/3dfx-tc1.htm
IPR2017-01818, Exhibit 1026. May 10, 2017 Letter.
IPR2017-01818, Exhibit 1060. William R. Stanek. Mozilla Source Code Quide. Netscape Communications Corporation.
IPR2017-01818, Exhibit 1066. Provisional Application 60258465.
IPR2017-01818, Exhibit 1067. Provisional Application 60258466.
IPR2017-01818, Exhibit 1068. Provisional Application 60258467.
IPR2017-01818, Exhibit 1069. Provisional Application 60258468.
IPR2017-01818, Exhibit 1070. Provisional Application 60258488.
IPR2017-01818, Exhibit 1071. Provisional Application 60258489.
IPR2018-00952. Petition, *Unified* v. *Bradium*.
IPR2018-00952. Bradium Exhibit List.
IPR2018-00952. Petitioner's Notice of Objections to Evidence.
IPR2018-00952. Unopposed Motion to Seal.
IPR2018-00952. Redacted Bradium Preliminary Response.
IPR2018-00952. Petitioner's Reply to Patent Owner's Preliminary Response.
IPR2018-00952, Exhibit 1005. Christopher Wilson CV.
IPR2018-00952, Exhibit 1005.1. Wilson Declaration.
IPR2018-00952, Exhibit 1005.2. Appendices A-D.
IPR2018-00952, Exhibit 1005.3. Appendices E-F.
IPR2016-00448. POs Motion for Observations on Cross-Exam.
IPR2016-00448. PO's Exhibit List 2.
IPR2016-00448. Motion to Exclude.
IPR2016-00448. Petitioner's Motion to Exclude Evidence.
IPR2016-00448. Updated Exhibit List.
IPR2016-00448. PO Opp to Pet.'s Mot. Exclude Evidence.
IPR2016-00448. Petitioner's Opposition to Motion to Exclude.
IPR2016-00448. Petitioner's Updated Exhibit List.
IPR2016-00448. Petitioner's Response to Patent Owner's Motion for Observation.
IPR2016-00448. Letter from C Coulson to E Day re Bradium-Microsoft IPRs.
IPR2016-00448. Patent Owner's Exhibit List 4.
IPR2016-00448. Petitioner's Reply to Patent Owner's Opposition to Motion to Exclude.
IPR2016-00448. PO's Reply to Opposition.
IPR2016-00448. PO's Exhibit List.
IPR2016-00448. *Bradium* v *MS Bradium Trial Demonstratives*.
IPR2016-00448. FWD errata.
IPR2016-00448. Final Written decision.
IPR2016-00448. Decision. on Pet. Motion to Exclude.
IPR2016-00448. Decision on PO Motion to Exclude—Final.
IPR2016-00448. Hearing transcript.
IPR2016-00448. Joint Motion to Maintain Documents as Confidential.
IPR2016-00448. Patent Owner's Notice of Appeal.
IPR2016-00448, Exhibit 1005. Part 2—Appendices J-KK to Michalson Declaration.
IPR2016-00448, Exhibit 1005. Part 1—Michalson Declaration with Appendices A-I.
IPR2016-00448, Exhibit 1007. Printout of IEEE Explore citations to Reddy (Ex1004).
IPR2016-00448, Exhibit 1010. Cover page of Reddy (Ex1004) from Linda Hall Library.

(56) References Cited

OTHER PUBLICATIONS

IPR2016-00448, Exhibit 1014. Isaac Levanon—LinkedIn.
IPR2016-00448, Exhibit 1014. Wikipedia Article IEEE 802.
IPR2016-00448, Exhibit 1016. Michalson Declaration.
IPR2016-00448, Exhibit 1017. Yonatan Lavi Declaration—with Exhibits A-E.
IPR2016-00448, Exhibit 1018. Peggy Agouris Deposition Transcript—with errata sheet.
IPR2016-00448, Exhibit 1022. The Universal Grid System.
IPR2016-00448, Exhibit 1026. Excerpt of Initial Claim Chart 343 Patent.
IPR2016-00448, Exhibit 1027. Bing Maps Preview app for Windows in the Windows Store.
IPR2016-00448, Exhibit 1028. Windows 8 System Requirements.
IPR2016-00448, Exhibit 1029. Compaq Internet Archive capture.
IPR2016-00448, Exhibit 1032. Michalson Errata.
IPR2016-00448, Exhibit 1035. Hearing transcript Feb. 3, 2016, *Bradium* v. *Microsoft*.
IPR2016-00448, Exhibit 1039. Letter from C. Coulson to C. Ng.
IPR2016-00448, Exhibit 1040. Email E. Day to C. Coulson.
IPR2016-00448, Exhibit 1041. Email E. Day to C. Coulson.
IPR2016-00448, Exhibit 1042. Email C. Coulson to E. Day.
IPR2016-00448, Exhibit 1043. C. Butler Affidavit re Internet Archive.
IPR2016-00448, Exhibit 1044. Ltr Resp to Coulson fr Day re Ex 1017.
IPR2016-00448, Exhibit 1045. Email E. Day to C. Coulson.
IPR2016-00448, Exhibit 1046. M. Bright Declaration.
IPR2016-00448, Exhibit 1047. Petitioner's Demonstratives for Oral Argument.
IPR2016-00448, Exhibit 2001. Scheduling Transcript.
IPR2016-00448, Exhibit 2001. Court Transcript, *Bradium Technologies* v. *Microsoft*, Civil Action 8 No. 15-31.
IPR2018-00952, Exhibit 1005.4. Appendices G-N.
IPR2018-00952, Exhibit 1005.5. Appendices O-MM.
IPR2018-00952, Exhibit 1008. Printout of Google Scholar citations to Reddy (Ex1004).
IPR2018-00952, Exhibit 1011. *Bradium* v. *Microsoft*, First Amended Complaint (Mar. 14, 2016).
IPR2018-00952, Exhibit 1013.3. File History of the 239 Patent Part Three.
IPR2018-00952, Exhibit 1017. Hall-Ellis Declaration.
IPR2018-00952, Exhibit 1024. Michalson Declaration.
IPR2018-00952, Exhibit 2027. Bradium. Patent Disclaimer.
IPR2018-00952, Exhibit 2028. Wikipedia Orthogonality.
IPR2018-00952, Exhibit 2034. USPTO Opp to Bradium's Motion for Leave.
IPR2018-00952, Exhibit 2036. Exhibit A to Quan Declaration (Redacted).
IPR2018-00952, Exhibit 2037. Declaration of M. Shanahan.
IPR2016-00448, Exhibit 2003. Declaration of Dr. Peggy Agouris.
IPR2016-00448, Exhibit 2019. Declarations of Isaac Levanon and Yoni Lavi.
IPR2016-00448, Exhibit 2020. Declarations of Isaac Levanon and Yoni Lavi.
IPR2016-00448, Exhibit 2021. 3DVU Launches Navi2Go for BlackBerry, the First 3D Picture Navigation, in Anticipation of the Bold, https://www.directionsmag.com/pressreleases/3dvu-launches-navi2go-for-blackberry-the-fir.
IPR2016-00448, Exhibit 2023. IBM letter of intent, Jul. 27, 2001.
IPR2016-00448, Exhibit 2025. Memorandum of understanding, 2002.
IPR2016-00448, Exhibit 2027. Project proposal, 3dVU.
IPR2016-00448, Exhibit 2031. Youtube screenshot, 3DVU YouTube Video 3DVU Image Navigation fuels Kenwood Systems in Japan, dated Aug. 22, 2006.
IPR2016-00448, Exhibit 2035. 3DVU Discussion materials: keyhole deal value analysis.
IPR2016-00448, Exhibit 2036. 3dVU Valuation Summary.
IPR2016-00448, Exhibit 2037. 3dvu/Daewoo license service agreement.
IPR2016-00448, Exhibit 2038. Daewoo introduces3DVU's Visual Map Navigation Technology. GIS Development Asiaa Pacicific, Jun. 2006.
IPR2016-00448, Exhibit 2039. Daewoo to Showcase 3DVU's Visual Map Navigation Technology at the Busan International Motor Show, Korea. http://www.theautochannel.com/news/2006/04/30/005219.html.
IPR2016-00448, Exhibit 2041. 3DVU Booklet.
IPR2016-00448, Exhibit 2042. Youtube sceenshot, NaviGo in Action.
IPR2016-00448, Exhibit 2043. Deposition transcript of Dr. Michalson.
IPR2016-00448, Exhibit 2044. Sho Tabata. NAVI2GO—3D Image Navigation System on Mobile Phone. TechNode 2008.
IPR2016-00448, Exhibit 2045. Jessica Dolcourt,3DVU announces Way2Go 3D mobile mapping, https://www.cnet.com/news/3dvu-announces-way2go-3d-mobile-mapping/.
IPR2016-00448, Exhibit 2046. 3DVU Releases the Ultimate Game-Changer in Mobile Navigation, Navi2Go Two-for-One. https://www.directionsmag.com/pressreleases/3dvu-releases-the-ultimate-game-changer-in.
IPR2016-00448, Exhibit 2047. 3DVU Enhancing Over 80 Million Nokia Phones With Navi2Go, the Only 3D Virtual World Mobile Navigation. https://www.directionsmag.com/pressreleases/3dvu-enhancing-over-80-million-nokia-pho.
IPR2016-00448, Exhibit 2048. 3DVU's Mobile Navigation Best Seller on Sprint's Shop.
IPR2016-00448, Exhibit 2049. Eze Vidra: NAVI2GO: The Ultimate Killer Navigation Application? https://www.vccafe.com/2008/11/12/navi2go-the-ultimate-killer-navigation-application/.
IPR2016-00448, Exhibit 2051. Kenwood manual with translation.
IPR2016-00448, Exhibit 2052. Kenwood Car Navigation System, Car Navigation System Catalog, HDX-700, HDZ-2570iTS, HDZ-2500iS.
IPR2016-00448, Exhibit 2053. Kenwood manual with translation.
IPR2016-00448, Exhibit 2054. Ronen Halevy. 3D GPS Navigation on Your BlackBerry. http://www.berryreview.com/2008/07/08/3d-gps-navigation-on-your-blackberry/.
IPR2016-00448, Exhibit 2055. Ludovic Privat. 3DVU signed up with Orange UK for off-board nav solution. http://www.gpsbusinessnews.com/3DVU-signed-up-with-Orange-UK-for-off-board-nav-.
IPR2016-00448, Exhibit 2056. Flyover trademark information.
IPR2016-00448, Exhibit 2057. Terravision downloads log.
IPR2016-00448, Exhibit 2059. Bing Maps tile system.
IPR2016-00448, Exhibit 2060. Declaration of Olena Irega.
IPR2016-00448, Exhibit 2063. 3DVU and Infoterra Signed a Memorandum of Understanding.
IPR2016-00448, Exhibit 2064. Declarations of Isaac Levanon and Yoni Lavi.
IPR2016-00448, Exhibit 2065. Declarations of Isaac Levanon and Yoni Lavi.
IPR2016-00448, Exhibit 2072. Isaac Levanon declaration.
IPR2016-00448, Exhibit 2073. Windows NT dictionary entry.
IPR2016-00448, Exhibit 2074. First Amended complaint for patent infringement, *Bradium technologies LLC* v. *Microsoft*, 1:15-cv-00031-RGA.
IPR2016-00448, Exhibit 2078. Deposition transcript of Michalson William R.
IPR2016-00448, Exhibit 2079. Email from Chris Coulson to Evan Day.
IPR2016-00448, Exhibit 2080. Email from Chris Coulson to Evan Day.
IPR2016-00448, Exhibit 2081. Email from Chris Coulson to Evan Day.
IPR2016-00449. PO Preliminary Response.
IPR2016-00449. Institution decision.
IPR2016-00449. 506—Petitioner's Objections to Evidence.
IPR2016-00449. IPR Petition of U.S. Pat. No. 8,924,506.
IPR2016-00449. Exhibit List.
IPR2016-00449. Patent Owner Response.
IPR2016-00449. Petitioner's Objections to Patent Owner's Evidence.
IPR2016-00449. Petitioner's Reply to Patent Owner's Response.
IPR2016-00449. Patent Owner's Objections to Evidence.

(56) References Cited

OTHER PUBLICATIONS

IPR2015-01432. Patent Owner Preliminary Response.
IPR2015-01432. Petioner's Reply.
IPR2015-01432. PO's Objections to Petitioner's Evidence.
IPR2015-01432. Deposition Transcript of Michalson, PhD., William R.
IPR2015-01432. Demonstrative Slides—Bradium—IPR2015-01432.
IPR2015-01432. Bradium Objections to MS Evidence for IPR2015-01432_794-Pat.
IPR2015-01432. Petitioner's Notice of Appeal.
IPR2015-01432. Patent Owner's Opposition to Motion to Exclude.
IPR2015-01432. Hearing transcript.
IPR2015-01432. Petitioner's Reply.
IPR2015-01432. Petitioner's Motion to Exclude Evidence.
IPR2015-01432. Bradium Exhibit List 4.
IPR2015-01432. Patent Owners Motion for Observations.
IPR2015-01432. Petitioner's Response to Patent Owner's Motion for Observation.
IPR2015-01432. Final written decision.
IPR2015-01432. Patent Owner Response Paper No. 24.
IPR2015-01432. Bradium Updated Exhibit List.
IPR2015-01432. Petitioner's Updated Exhibit List.
IPR2015-01432. Petitioner's Reply to Patent Owner's Opposition re MTE.
IPR2015-01432. Bradium Exhibit List 3.
IPR2015-01432. Petitioner's Objections to Patent Owner's Evidence.
IPR2015-01432, Exhibit 1008. Part II Appendices P-DD.
IPR2015-01432, Exhibit 1008. Michalson Declaration with Appendices A-O.
IPR2015-01432, Exhibit 1013. Carpenter Declaration.
IPR2015-01432, Exhibit 1015. Michalson Declaration ISO Petitioner's Reply (with Appendices EE-FF)1.
IPR2015-01432, Exhibit 1017. Petitioner's Demonstratives for Oral Argument.
IPR2015-01432, Exhibit 2001. Bajaj Declaration with Appendices A-D.
IPR2015-01434. Decision denying institution.
IPR2015-01434. 343 Petition.
IPR2015-01434. Patent Owner Preliminary Response.
IPR2015-01434, Exhibit 1009. Michalson Declaration with Appendices A-O.
IPR2015-01434, Exhibit 1009. Part II Appendices P-FF.
IPR2015-01434, Exhibit 1013. Claim Language of the 343 Patent.
IPR2015-01435. Decision denying institution.
IPR2015-01435. 506 Petition.
IPR2015-01435. Patent Owner Preliminary Response.
IPR2015-01435, Exhibit 1009. Michalson Declaration with Appendices A-O.
IPR2015-01435, Exhibit 1009. Part II Appendices P-EE.
IPR2015-01435, Exhibit 1012. Claim Language of the 506 Patent.
IPR2015-01435, Exhibit 1013. Lindstrom Declaration.
IPR2016-00448. Patent Owner's Preliminary Response.
IPR2016-00448. Instituition decision.
IPR2016-00448. 343—Petitioner's Objections to Evidence.
IPR2016-00448. IPR Petition of U.S. Pat. No. 7,908,343.
IPR2016-00448. Petitioner's Objections to Patent Owner's Evidence.
IPR2016-00448. Exhibit list.
IPR2016-00448. Patent Owner's Response (Redacted).
IPR2016-00448. PO Response.
IPR2016-00448. 343 Petitioner's Reply to Patent Owner's Response.
IPR2016-00448. PO's Objections to Petitioner's Evidence.
IPR2016-00449. POs Motion for Observations on Cross-Exam.
IPR2016-00449. PO's Exhibit List 2.
IPR2016-00449. Petitioner's Motion to Exclude Evidence.
IPR2016-00449. Updated Exhibit List.
IPR2016-00449. Motion to Exclude.
IPR2016-00449. Petitioner's Opposition to Motion to Exclude.
IPR2016-00449. PO Opp to Pet's Mot. Exclude Evidence.
IPR2016-00449. Petitioner's Response to Patent Owner's Motion for Observation.
IPR2016-00449. Petitioner's Updated Exhibit List.
IPR2016-00449. PO's Reply ISO Mot to Exclude Evidence.
IPR2016-00449. Patent Owner's Exhibit List 4.
IPR2016-00449. Petitioner's Reply to Patent Owner's Opposition to Motion to Exclude.
IPR2016-00449. PO's Exhibit List 5.
IPR2016-00449. Decision on motion.
IPR2016-00449. Final written decision.
IPR2016-00449. Decision on PO motion.
IPR2016-00449. Joint Motion to Maintain Confidential Docs or Expunge.
IPR2016-00449. Patent Owner's Notice of Appeal.
IPR2016-00449, Exhibit 1005. Michalson Declaration with Appendices A-I.
IPR2016-00449, Exhibit 1005. Appendices J-KK to Michalson Declaration.
IPR2016-00449, Exhibit 1016. Michalson Declaration.
IPR2016-00449, Exhibit 1026. Excerpt of Initial Claim Chart 506 Patent.
IPR2016-00449, Exhibit 1032. Michalson Errata.
IPR2016-00449, Exhibit 1033. 3DVU Delaware corporate records.
IPR2016-00449, Exhibit 1039. Letter from C. Coulson to C. Ng.
IPR2016-00449, Exhibit 1040. Email E. Day to C. Coulson.
IPR2016-00449, Exhibit 1041. Feb. 27, 2017 Email E. Day to C. Coulson.
IPR2016-00449, Exhibit 1042. Mar. 12, 2017 Email C. Coulson to E. Day.
IPR2016-00449, Exhibit 1044. Ltr Resp to Coulson fr Day re Ex 1017.
IPR2016-00449, Exhibit 1045. Mar. 13, 2017 Email E. Day to C. Coulson.
IPR2016-00449, Exhibit 1047. Petitioner's Demonstratives for Oral Argument.
IPR2016-00449, Exhibit 2078. Michalson's deposition transcript.
IPR2016-01897. 239 Petition.
IPR2016-01897. Preliminary Response.
IPR2016-01897. Exhibit List.
IPR2016-01897. Institution decision.
IPR2016-01897. PO's Objections to Petitioner's Evidence.
IPR2016-01897. Petitioner's Objections to Patent Owner's Evidence.
IPR2016-01897. 239 Updated Exhibit List.
IPR2016-01897. PO's Exhibit List 2.
IPR2016-01897. PO's Response.
IPR2016-01897. Joint Motion to Terminate.
IPR2016-01897, Exhibit 1005. Michalson Declaration—Appendices O-MM.
IPR2016-01897, Exhibit 1005. Michalson Declaration—Appendices A-N.
IPR2016-01897, Exhibit 1011. First Amended Complaint Mar. 14, 2016.
IPR2016-01897, Exhibit 1013. File History of the 239 Patent Part One.
IPR2016-01897, Exhibit 1013. File History of the 239 Patent Part Two.
IPR2015-01432, Exhibit 1011. Peter Lindstrom, et al. An Integrated Global GIS and Visual Simulation System. Georgia Institute of Technology, 1997.
IPR2015-01432, Exhibit 2002. C. Bajaj. GIS visualization paradigms.
IPR2015-01432, Exhibit 2003. C. Bajaj, D. Schikore. Topology Preserving Data Simplification with Error Bounds Journal on Computers and Graphics, vol. 22.1, pp. 3-12, 1998.
IPR2015-01432, Exhibit 2005. Excerpt: Coppock, Geographical Information Systems Principles and Applications vol. 1 (Ch 2).
IPR2015-01434, Exhibit 1002. Michael Potmesil. Maps alive: viewing geospatial information on the WWW. Computer Networks and ISDN Systems. vol. 29, Sep. 1997.

(56) References Cited

OTHER PUBLICATIONS

IPR2016-00448, Exhibit 1004. Reddy ,et al. TerraVision II: Visualizing Massive Terrain Databases in VRML. IEEE Computer Graphics and Application 19 No. 2 (1999).
IPR2016-00448, Exhibit 1020. Fujitsu Technical Reference Guide.
IPR2016-00448, Exhibit 1031. Intel Microprocessor Quick Reference Guide.
IPR2016-00448, Exhibit 2005. Leaver Greg. VRML Terrain Modeling for the Monterey Bay National Marine Sanctuary (MBNMS). Naval Postgraduate School, Monterey CA, 1988.
IPR2016-00448, Exhibit 2006. Excerpt: David J.Maguire ,Michael F. Goodchild, and David W Rhind. Geographical Information System vol. 1: Principles, Longman Scientific Technical, 1991.
IPR2016-00448, Exhibit 2007. Excerpt: David J.Maguire ,Michael F. Goodchild, and David W Rhind. Geographical Information System vol. 2: Applications, Longman Scientific Technical, 1991.
IPR2016-00448, Exhibit 2010. White, Richard L., and Jeffrey W. Percival. Compression and progressive transmission of astronomical images. Advanced Technology Optical Telescopes V, vol. 2199, pp. 703-714.
IPR2016-00448, Exhibit 2030. Isaac Levanon. News Release: FlyOver Visual Map™ Technology the first 3D aerial imagery Map to enriched Kenwood's new HDD car navigation system. Oct. 6, 2002. http://www.silicomventures.com/newsletter_10_29_02/FlyOver.htm.
IPR2016-00448, Exhibit 2058. TerraVision Open Sourced (/p/terravision/news/2002/11/terravision-open-sourced/). Posted by (/u/martinreddy/) Nov. 1, 2002.
IPR2016-00448, Exhibit 2067. George Strawn. Next Generation Internet(NGI) Initiative.
IPR2016-00449, Exhibit 2002. Prasad, Arjun Sathyanarayana. Accelerating SIFT Feature extraction with a vector DSP-A feasibility study. Thesis.
IPR2016-01897, Exhibit 1020. Microsoft TerraServer.
IPR2016-01897, Exhibit 1025. TerraServer Image Loading and Cutting Process. https://web.archive.org/web/20000914164508/http://terraserver.microsoft.com/qa_load_graph2.asp[Apr. 26, 2017.
IPR2016-01897, Exhibit 1026. TerraServer Site Story. http://terraserver.microsoft.com/terra_story_scale.asp.
IPR2016-01897, Exhibit 1029. TerraServer Interface. https://web.archive.org/web/20000707214318/http://terraserver.microsoft.com:80/terra_story_interface.asp[Apr. 26, 2017.
IPR2016-01897, Exhibit 2010. White & Percival, Compression and Progressive Transmission of Astronomical Images. SPIE Proceedings vol. 2199, Advanced Technology Optical Telescopes V; (1994).
IPR2017-01817, Exhibit 1044. Excerpt. KILLELEA. Web Performance Tuning. O'Reilly Media, Inc., 2002.
IPR2017-01817, Exhibit 1047. Apple iBook Feature Pages.
IPR2017-01817, Exhibit 1048. Apple Airport Fact Sheet (1999).
IPR2017-01817, Exhibit 1049. Apple Airport Products—Tech Overview.
IPR2017-01817, Exhibit 1054. Excerpt: Mark Brown. Using Netscape 2. Que Corporation.
IPR2017-01817, Exhibit 1055. Excerpt: Abraham Silberschatz, Peter Baer Galvin. Operating System Concepts. Addison Wesley Longman, Inc.
IPR2017-01817, Exhibit 1056. Excerpt: Aaron Cohen, Mike Woodring . Wln32 Multithreaded programming. O'Reilly Media. Dec. 1997.
IPR2017-01817, Exhibit 1059. Excerpt: Eric Giguere. Palm Database Programming: The Complete Developer's Guide . Willey, 1999.
IPR2017-01817, Exhibit 1061. nsCacheManager.h, source code from Netscape Communications Corporation.
IPR2017-01817, Exhibit 1062. nsMemModule.h, source code from Netscape Communications Corporation.
IPR2017-01817, Exhibit 1064. Excerpt: Francesco Balena. Visual Basic 6.0. Microsoft Press. 1999.
IPR2017-01818, Exhibit 1011. Barbara Fuller, "Fuller—The MAGIC Project," IEEE Network 10.3 (1996): 15-25.
IPR2017-01818, Exhibit 1032. Barclay, Tom, et al. Microsoft TerraServer A Spatial Data Warehouse.
IPR2017-01818, Exhibit 1034. Barclay, Tom, et al. Microsoft TerraServer (1998).
IPR2017-01818, Exhibit 1035. Barclay, Tom,, Tom, et al. Terraserver ACM SIGMOD Record. vol. 29. No. 2. ACM, 2000.
IPR2017-01818, Exhibit 1037. Microsoft, Partners Announce Microsoft TerraServer.
IPR2017-01818, Exhibit 1041. TerraServer Scale. http://terraserver.microsoft.com/terra_story_scale.asp.
IPR2017-01818, Exhibit 1043. Excerpt:Namir C. Shammas. Foundations of C++ and Object Oriented Programming. IDG Books Worldwide, Inc., 1995.
IPR2017-01818, Exhibit 1046. Steve Lohr. Apple Offers iMac's Laptop Offspring, the iBook http://www.nytimes.com/1999/07/22/business/appleoffersimacslaptopoffspringtheibook. Html.
IPR2017-01818, Exhibit 1053. Excerpts: Chuck Musciano and Bill Kennedy. HTML and XHTML. O'Reilly Associates.
IPR2017-01818, Exhibit 1058. Excerpt:Douglas Boling. Programming Microsoft Windows CE. Microsoft Press.
IPR2017-01818, Exhibit 1063. nsDiskModule.h, source code from Netscape Communications Corporation.
IPR2018-00952, Exhibit 1015. Provisional App 60109077 (Loomans Provisional).
IPR2018-00952, Exhibit 1023. MacAddict (1997).
IPR2018-00952, Exhibit 2022. Garland et al, Implementing Distributed Server Groups for the World Wide Web (1995).
IPR2015-01432. Institution decision.
IPR2015-01432. Bradium Objections to Petitioner Supplemental Evidence.
IPR2015-01432. Bradium PO Response.
IPR2015-01432. 794 Petition.

* cited by examiner

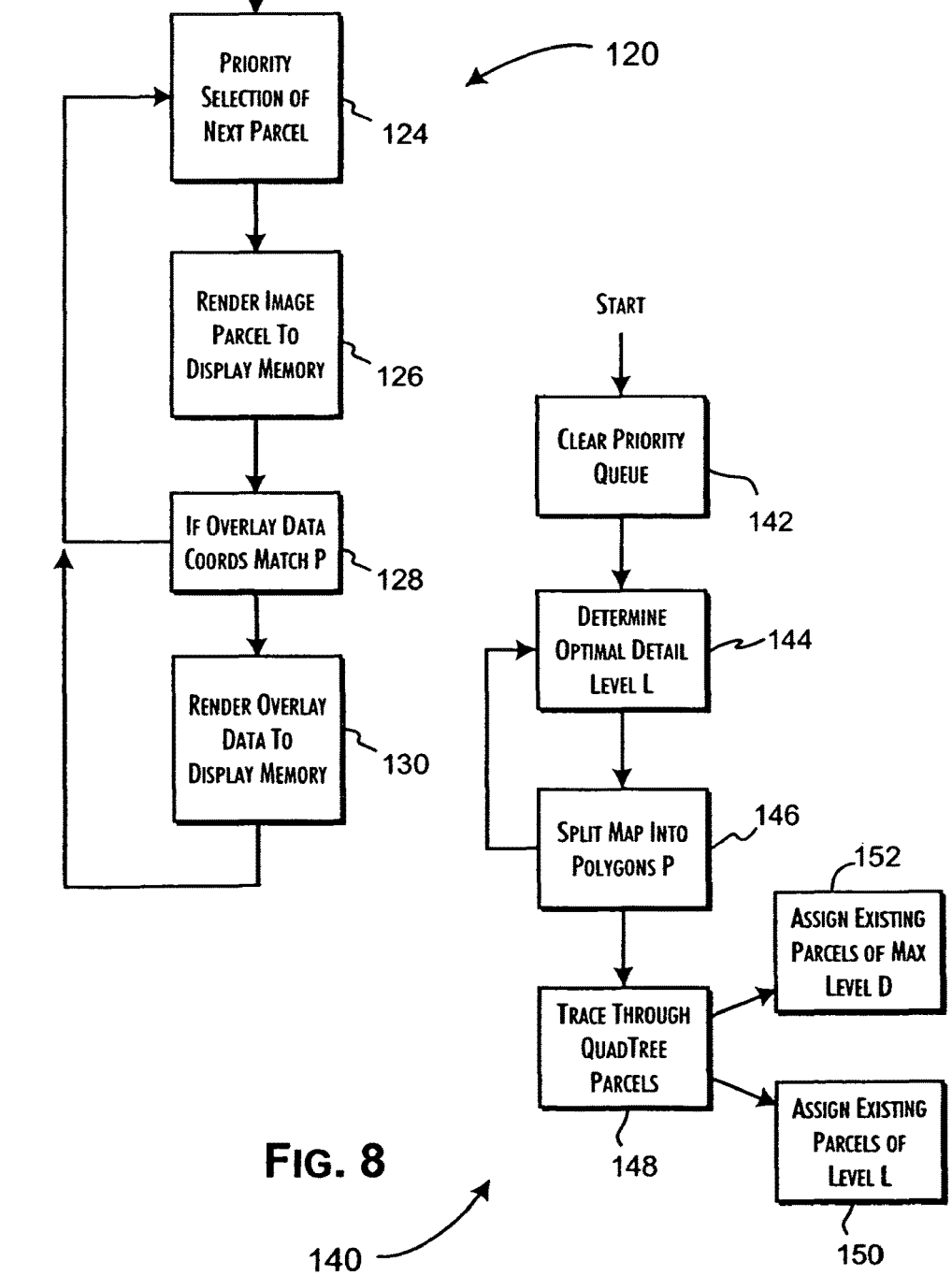

OPTIMIZED IMAGE DELIVERY OVER LIMITED BANDWIDTH COMMUNICATION CHANNELS

PRIORITY CLAIMS/RELATED APPLICATIONS

This application is a continuation of and claims priority to U.S. patent application Ser. No. 15/457,816, filed Mar. 13, 2017, entitled OPTIMIZED IMAGE DELIVERY OVER LIMITED BANDWIDTH COMMUNICATION CHANNELS; which is a continuation and claims priority to U.S. patent application Ser. No. 15/343,052, filed Nov. 3, 2016, entitled OPTIMIZED IMAGE DELIVERY OVER LIMITED BANDWIDTH COMMUNICATION CHANNELS, now U.S. Pat. No. 9,635,136; which is a continuation of and claims priority to U.S. patent application Ser. No. 15/281,037, filed Sep. 29, 2016, entitled OPTIMIZED IMAGE DELIVERY OVER LIMITED BANDWIDTH COMMUNICATION CHANNELS, now U.S. Pat. No. 9,641,645; which is a continuation of and claims priority to U.S. patent application Ser. No. 14/970,526, filed Dec. 15, 2015, entitled OPTIMIZED IMAGE DELIVERY OVER LIMITED BANDWIDTH COMMUNICATION CHANNELS, now U.S. Pat. No. 9,641,645; which is a continuation of and claims priority to U.S. patent application Ser. No. 14/547,148, filed Nov. 19, 2014, entitled OPTIMIZED IMAGE DELIVERY OVER LIMITED BANDWIDTH COMMUNICATION CHANNELS, now U.S. Pat. No. 9,253,239; which is a continuation of and claims priority to U.S. patent application Ser. No. 13/027,929, filed Feb. 15, 2011, entitled OPTIMIZED IMAGE DELIVERY OVER LIMITED BANDWIDTH COMMUNICATION CHANNELS, now U.S. Pat. No. 8,924,506; which is a continuation-in-part of and claims priority to U.S. patent application Ser. No. 12/619,643, filed on Nov. 16, 2009, entitled OPTIMIZED IMAGE DELIVERY OVER LIMITED BANDWIDTH COMMUNICATION CHANNELS, now U.S. Pat. No. 7,908,343; which is a continuation of and claims priority to U.S. patent application Ser. No. 10/035,987, filed on Dec. 24, 2001, entitled OPTIMIZED IMAGE DELIVERY OVER LIMITED BANDWIDTH COMMUNICATION CHANNELS, now U.S. Pat. No. 7,644,131; which claims the benefit under 35 U.S.C. § 119(e) of U.S. Provisional Applications with Nos. 60/258,488, 60/258,489, 60/258,465, 60/258,468, 60/258,466, and 60/258,467, all filed Dec. 27, 2000. The disclosures of all the foregoing patent documents are incorporated herein by reference as if fully set forth herein, including Figures, Claims, and Tables. The present application is also related to application Ser. No. 10/035,981, entitled SYSTEM AND METHODS FOR NETWORK IMAGE DELIVERY WITH DYNAMIC VIEWING FRUSTUM OPTIMIZED FOR LIMITED BANDWIDTH COMMUNICATION CHANNELS, Levanon et al., filed on Dec. 24, 2001, now U.S. Pat. No. 7,139,794, issued on Nov. 21, 2006, which is assigned to the Assignee of the present Application.

FIELD

The disclosure is related to network based, image distribution systems and, in particular, to a system and methods for efficiently selecting and distributing image parcels through a narrowband or otherwise limited bandwidth communications channel to support presentation of high-resolution images subject to dynamic viewing frustums.

BACKGROUND

The Internet and or other network systems may provide a unique opportunity to transmit for example complex images, typically large scale bit-maps, particularly those approaching photo-realistic levels, over large area and or distances. In common application, the images may be geographic, topographic, and or other highly detailed maps. The data storage requirements and often proprietary nature of such images could be such that conventional interests may be to transfer the images on an as-needed basis.

In conventional fixed-site applications, the image data may be transferred over a relatively high-bandwidth network to client computer systems that in turn, may render the image. Client systems may typically implement a local image navigation system to provide zoom and or pan functions based on user interaction. As well recognized problem with such conventional systems could be that full resolution image presentation may be subject to the inherent transfer latency of the network. Different conventional systems have been proposed to reduce the latency affect by transmitting the image in highly compressed formats that support progressive resolution build-up of the image within the current client field of view. Using a transform compressed image transfer function increases the field of the image that can be transferred over a fixed bandwidth network in unit time. Progressive image resolution transmission, typically using a differential resolution method, permits an approximate image to be quickly presented with image details being continuously added over time.

Tzou, in U.S. Pat. No. 4,698,689, describes a two-dimensional data transform system that supports transmission of differential coefficients to represent an image. Subsequent transmitted coefficient sets are progressively accumulated with prior transmitted sets to provide a succeedingly refined image. The inverse-transform function performed by the client computer is, however, highly compute intensive. In order to simplify the transform implementation and further reduce the latency of presenting any portion of an approximate image, images are subdivided into a regular array. This enables the inverse-transform function on the client, which is time-critical, to deal with substantially smaller coefficient data sets. The array size in Tzou is fixed, which leads to progressively larger coefficient data sets as the detail level of the image increases. Consequently, there is an inherently increasing latency in resolving finer levels of detail.

An image visualization system proposed by Yap et al., U.S. Pat. No. 6,182,114, overcomes some of the foregoing problems. The Yap et al. system also employs a progressive encoding transform to compress the image transfer stream. The transform also operates on a subdivided image, but the division is indexed to the encoding level of the transform. The encoded transform coefficient data sets are, therefore, of constant size, which supports a modest improvement in the algorithmic performance of the inverse transform operation required on the client.

Yap et al. adds utilization of client image panning or other image pointing input information to support a foveation-based operator to influence the retrieval order of the subdivided image blocks. This two-dimensional navigation information is used to identify a foveal region that is presumed to be the gaze point of a client system user. The foveation operator defines the corresponding image block as the center point of an ordered retrieval of coefficient sets representing a variable resolution image. The gaze point image block represents the area of highest image resolution, with resolution reduction as a function of distance from the gaze point determined by the foveation operator. This technique thus progressively builds image resolution at the gaze point and succeedingly outward based on a relatively compute intensive function. Shifts in the gaze point can be responded to with relative speed by preferentially retrieving coefficient sets at and near the new foveal region.

Significant problems remain in permitting the convenient and effective use of complex images by many different types of client systems, even with the improvements provided by the various conventional systems. In particular, the implementation of conventional image visualization systems is generally unworkable for smaller, often dedicated or embedded, clients where use of image visualization would clearly be beneficial. Conventional approaches effectively presume that client systems have an excess of computing performance, memory and storage. Small clients, however, typically have restricted performance processors with possibly no dedicated floating-point support, little general purpose memory, and extremely limited persistent storage capabilities, particularly relative to common image sizes. A mobile computing device such as mobile phone, smart phone, tablet and or personal digital assistant (PDA) is a characteristic small client. Embedded, low-cost kiosk, automobile navigation systems and or Internet enabled I connected TV are other typical examples. Such systems are not readily capable, if at all, of performing complex, compute-intensive Fourier or wavelet transforms, particularly within a highly restricted memory address space.

As a consequence of the presumption that the client is a substantial computing system, conventional image visualization systems also presume that the client is supported by a complete operating system. Indeed, many expect and require an extensive set of graphics abstraction layers to be provided by the client system to support the presentation of the delivered image data. In general, these abstraction layers are conventionally considered required to handle the mapping of the image data resolution to the display resolution capabilities of the client system. That is, resolution resolved image data provided to the client is unconstrained by any limitation in the client system to actually display the corresponding image. Consequently, substantial processor performance and memory can be conventionally devoted to handling image data that is not or cannot be displayed.

Another problem is that small clients are generally constrained to generally to very limited network bandwidths, particularly when operating under wireless conditions. Such limited bandwidth conditions may exist due to either the direct technological constraints dictated by the use of a low bandwidth data channel or indirect constraints imposed on relatively high-bandwidth channels by high concurrent user loads. Cellular connected PDAs and webphones are examples of small clients that are frequently constrained by limited bandwidth conditions. The conventionally realizable maximum network transmission bandwidth for such small devices may range from below one kilobit per second to several tens of kilobits per second. While Yap et al. states that the described system can work over low bandwidth lines, little more than utilizing wavelet-based data compression is advanced as permitting effective operation at low communications bandwidths. While reducing the amount of data that must be carried from the server to the client is significant, Yap et al. simply relies on the data packet transfer protocols to provide for an efficient transfer of the compressed image data. Reliable transport protocols, however, merely mask packet losses and the resultant, sometimes extended recovery latencies. When such covered errors occur, however, the aggregate bandwidth of the connection is reduced and the client system can stall waiting for further image data to process.

Consequently, there remains a need for an image visualization system that can support small client systems, place few requirements on the supporting client hardware and software resources, and efficiently utilize low to very low bandwidth network connections.

SUMMARY

Thus, a general purpose of the present invention is to provide an efficient system and methods of optimally presenting image data on client systems with potentially limited processing performance, resources, and communications bandwidth.

This is achieved in the present invention by providing for the retrieval of large-scale images over network communications channels for display on a client device by selecting an update image parcel relative to an operator controlled image viewpoint to display via the client device. A request is prepared for the update image parcel and associated with a request queue for subsequent issuance over a communications channel. The update image parcel is received from the communications channel and displayed as a discrete portion of the predetermined image. The update image parcel optimally has a fixed pixel array size, is received in a single and or plurality of network data packets, and were the fixed pixel array may be constrained to a resolution less than or equal to the resolution of the client device display.

An advantage of the present invention is that both image parcel data requests and the rendering of image data are optimized to address the display based on the display resolution of the client system.

Another advantage of the present invention is that the prioritization of image parcel requests is based on an adaptable parameter that minimizes the computational complexity of determining request prioritization and, in turn, the progressive improvement in display resolution within the field of view presented on a client display.

A further advantage of the present invention is that the client software system requires relatively minimal client processing power and storage capacity. Compute intensive numerical calculations are minimally required and image parcel data is compactly stored in efficient data structures. The client software system is very small and easily downloaded to conventional computer systems or embedded in conventional dedicated function devices, including portable devices, such as PDAs, tablets and webphones.

Still another advantage of the present invention is that image parcel data requests and presentation can be readily optimized to use low to very low bandwidth network connections. The software system of the present invention provides for re-prioritization of image parcel data requests and presentation in circumstances where the rate of point-of-view navigation exceeds the data request rate.

Yet another advantage of the present invention is that image parcel data rendering is performed without requiring any complex underlying hardware or software display subsystem. The client software system of the present invention includes a bit-map rendering engine that draws directly to the video memory of the display, thus placing minimal requirements on any underlying embedded or disk operating system and display drivers. Complex graphics and animation abstraction layers are not required.

Still another advantage of the present invention is that image parcel block compression is used to obtain fixed size transmission data blocks. Image parcel data is recoverable from transmission data using a relatively simple client decompression algorithm. Using fixed size transmission data blocks enables image data parcels to be delivered to the client in bounded time frames.

A yet further advantage of the present invention is that multiple data forms can be transferred to the client software system for concurrent display. Array overlay data, correlated positionally to the image parcel data and generally insensitive to image parcel resolution, can be initially or progressively provided to the client for parsing and parallel presentation on a client display image view.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein:

FIG. 7 provides a process flow diagram showing a display image rendering thread implemented in a preferred embodiment of the present invention;

FIG. 8 provides a process flow diagram showing the parcel map processing performed preliminary to the rendering of image data parcels in accordance with a preferred embodiment of the present invention;

DETAILED DESCRIPTION OF ONE OR MORE EMBODIMENTS

Figure 1:
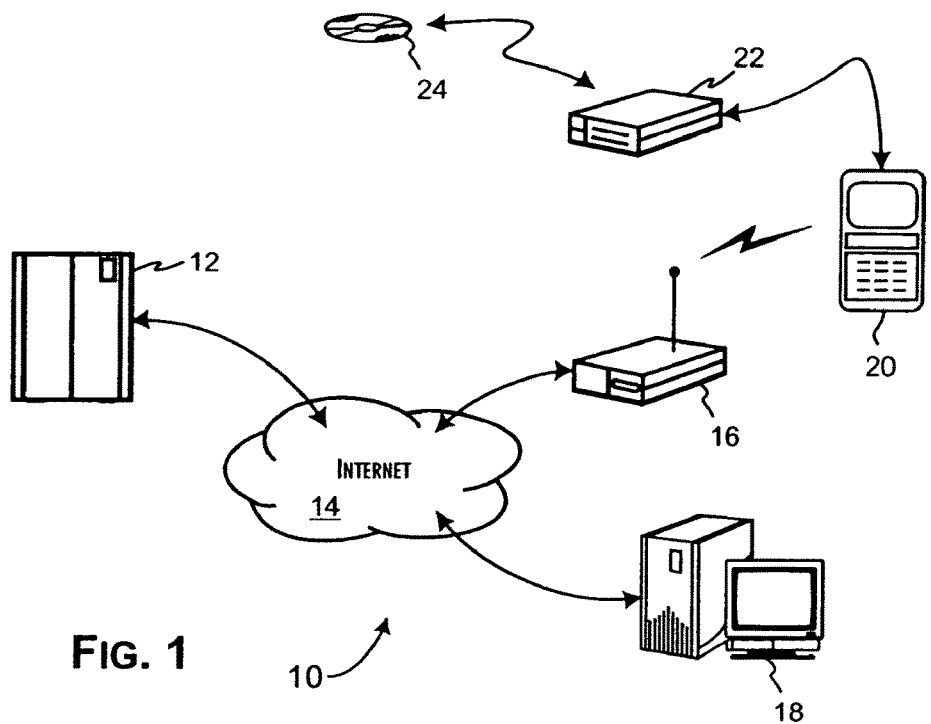
FIG. 1 depicts a preferred system environment within which various embodiments of the present invention can be utilized.

The preferred operational environment 10 of the present invention is generally shown in FIG. 1. A network server system 12, operating as a data store and server of image data, is responsive to requests received through a communications network, such as the Internet 14 generally and various tiers of internet service providers (ISPs) including a wireless connectivity provider 16. Client systems, including conventional workstations and personal computers 18 and smaller, typically dedicated function devices often linked through wireless network connections, such as PDAs, webphones 20, and automobile navigation systems, source image requests to the network server 12, provide a client display and enable image navigational input by a user of the client system. Alternately, a dedicated function client system 20 may be connected through a separate or plug-in local network server 22, preferably implementing a small, embedded Web server, to a fixed or removable storage local image repository 24. Characteristically, the client system 18, 20 displays are operated at some fixed resolution generally dependent on the underlying display hardware of the client systems 18, 20.

The image navigation capability supported by the present invention encompasses a viewing frustum placed within a three-dimensional space over the imaged displayed on the client 18, 20. Client user navigational inputs are supported to control the x, y lateral, rotational and z height positioning of the viewing frustum over the image as well as the camera angle of incidence relative to the plane of the image. To effect these controls, the software implemented on the client systems 18, 20 supports a three-dimensional transform of the image data provided from the server 12, 22.

Figure 2:
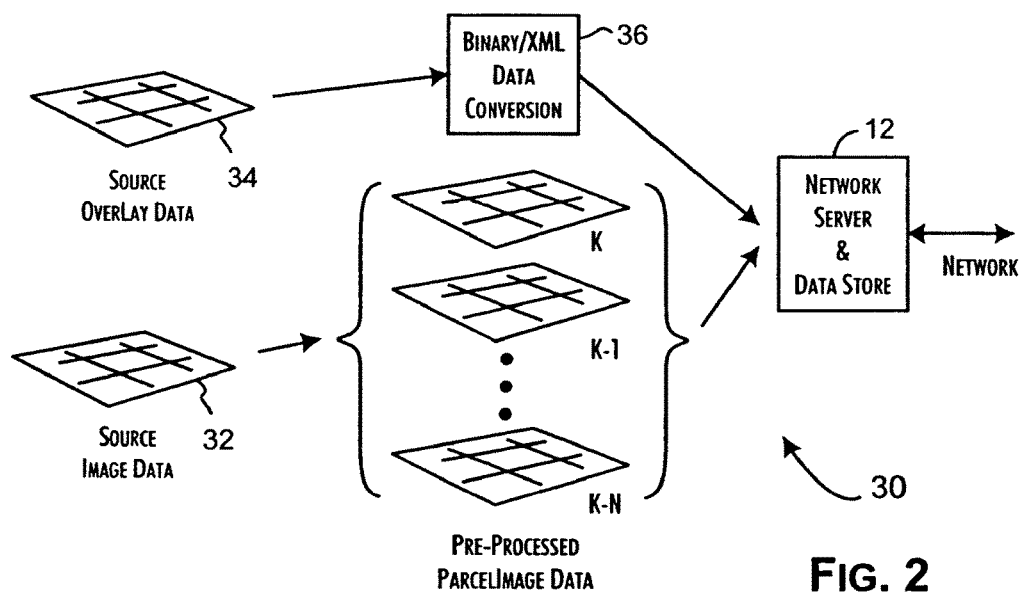
FIG. 2 is a block diagram illustrating the preparation of image parcel and overlay data set that are to be stored by and served from a network server system in accordance with a preferred embodiment of the present invention.

In accordance with the preferred embodiments of the present invention, as generally illustrated in FIG. 2, a network image server system 30 stores a combination of source image data 32 and source overlay data 34. The source image data 32 is typically high-resolution bit-map raster map and or satellite imagery of geographic regions, which can be obtained from commercial suppliers. The overlay image data 34 is typically a discrete data file providing image annotation information at defined coordinates relative to the source image data 32. In the preferred embodiments of the present invention, image annotations include, for example, street, building and landmark names, as well as representative 2 and 3D objects, graphical icons, decals, line segments, and or text and or other characters, graphics and or other media.

The network image server system 30 preferably pre-processes the source image data 32 and or source overlay data 34 to forms preferred for storage and serving by the network server 12, 22. The source image data 32 is preferably pre-processed to obtain a series $K_{1-N}$ of derivative images of progressively lower image resolution. The source image data 32, corresponding to the series image $K_0$, is also subdivided into a regular array such that each resulting image parcel of the array has for example a 64 by 64 pixel resolution where the image data has a color or bit per pixel depth of 16 bits, which represents a data parcel size of 8K bytes. The resolution of the series $K_{1-N}$ of derivative images is preferably related to that of the source image data 32 or predecessor image in the series by a factor of four. The array subdivision is likewise related by a factor of four such that each image parcel is of a fixed 8K byte size.

In the preferred embodiment of the present invention, the image parcels are further compressed and stored by the network server 12, 22. The preferred compression algorithm may implement for example a fixed 4:1 compression ratio such that each compressed and stored image parcel has a fixed 2K byte size. The image parcels are preferably stored in a file of defined configuration such that any image parcel can be located by specification of a $K_D$, X, Y value, representing the image set resolution index D and corresponding image array coordinate.

In other implementations, the image array dimensions (which as 64×64 above) may be powers of two so that the image array can be used in texture mapping efficiently. To accommodate different data parcel size than the 2KByte associated with 64×64 pixel parcel dimension described above and other communication protocol and overhead requirements, to accommodate transmission through other than a 3KByte per second transmission channel, the present invention may use larger compression ratios that takes, for example, a 128×128 or 256×256 pixel parcel dimension and compresses it to meet the 3KByte per second transmission channel, or other communication bandwidth used to stream the parcel.

The system may also accommodate different and larger data parcel sizes as transmission protocols, compression ratio achieved and micro-architectures of the client computers change. For purposes above, the data content was a pixel array representing image data. Where the data parcel content is vector, text or other data that may subject to different client system design factors, other parcel sizes may be used. Furthermore, the parcel sizes can be different between the server and the client. For example the server may create parcels or hold parcels, for streaming with 256×256 pixel parcel dimension and the client my render them as 64×64. In addition, parcels sizes on different servers may vary from one server to another and from the client side rendering. In the system, each grid is treated as a sparse data array that can be progressively revised to increase the resolution of the grid and thereby the level of detail presented by the grid.

The source overlay data 34 is preferably pre-processed 36 into either an open XML format, such as the Geography Markup Language (GML), which is an XML based encoding standard for geographic information developed by the OpenGIS Consortium (OGC; www.opengis.org), or a proprietary binary representation. The XML/GML representation is preferred as permitting easier interchange between different commercial entities, while the binary representation is preferred as more compact and readily transferable to a client system 18, 20. In both cases, the source overlay data 34 is pre-processed to contain the annotation data preferably in a resolution independent form associated with a display coordinate specification relative to the source image data 32. The XML, GML or binary overlay data may be compressed prior to storage on the network server 12, 22.

Figure 3:
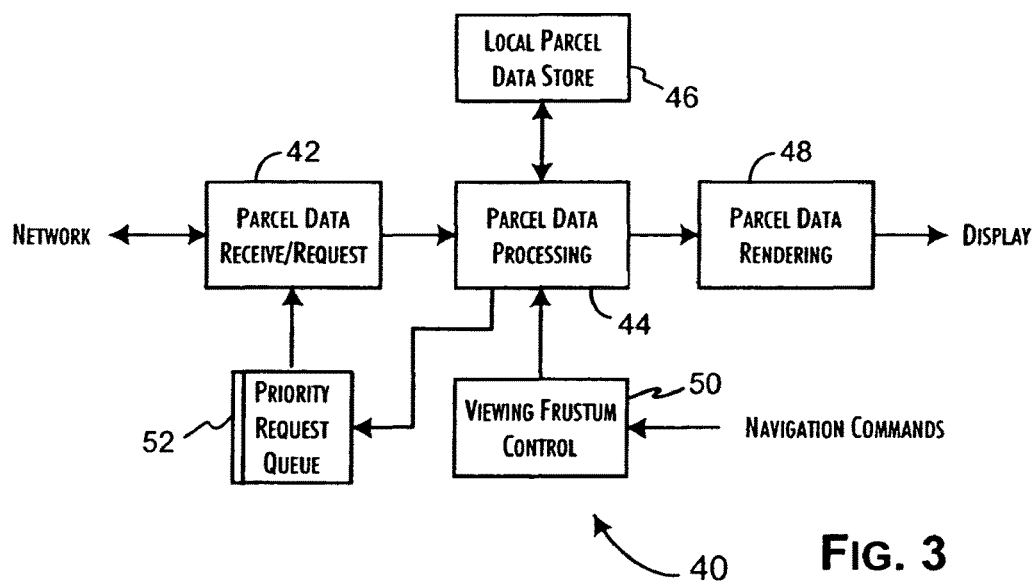
FIG. 3 is a block diagram of a client system image presentation system constructed in accordance with a preferred embodiment of the present invention.

The preferred architecture 40 of a client system 18, 20, for purposes of implementing the present invention, is shown in FIG. 3. The architecture 40 is preferably implemented by software plug-in or application executed by the client system 18, 20 and that utilizes basic software and hardware services provided by the client system 18, 20. A parcel request client 42 preferably implements an HTML client that supports HTML-based interactions with the server 12, 22 using the underlying network protocol stack and hardware network interface provided by the client systems 18, 20. A central parcel processing control block 44 preferably implements the client process and control algorithms. The control block 44 directs the transfer of received image parcels and XML/GML/binary overlay data to a local parcel data store 46. Local parcel data store 46 may also act for example as local cache weather the entire data or part of it is in dynamic and/or static cache. Preferably image data parcels are stored in conventional quad-tree data structures, where tree nodes of depth D correspond to the stored image parcels of a derivative image of resolution KD. The XML/GML/binary overlay data is preferably stored as a data object that can be subsequently read by an XML/GML/binary parser implemented as part of the control block 44.

The control block 44 is also responsible for decompressing and directing the rendering of image parcels to a local display by a rendering engine 48. Preferably, the rendering engine 48 writes to the video memory of the underlying client display hardware relying on only generic graphics acceleration hardware capabilities and may take advantage of more advanced graphics acceleration hardware when available in the client system 18, 20. In general, the relied-on capabilities include bit-bit and related bit-oriented functions that are readily supported by current conventional display controller hardware. The rendering engine 48 is optimized to perform image parcel texture mapping without reliance on complex floating point operations, permitting even relatively simple processors to efficiently execute the rendering engine 48. The rendering engine 48 may take advantage of floating point operations when available in the client system 18, 20.

Changes in the viewing frustum are determined from user input navigation commands by a frustum navigation block 50. In the preferred embodiments of the present invention, the input navigation controls are modeled for three-dimensional fly-over navigation of the displayed image. The navigation controls support point-of-view rotation, translation, attitude, and altitude over the displayed image. The effective change in viewing frustum as determined by the frustum navigation block 50 is provided to the control block 44.

The control block 44, based in part on changes in the viewing frustum, determines the ordered priority of image parcels to be requested from the server 12, 22 to support the progressive rendering of the displayed image. The image parcel requests are placed in a request queue 52 for issuance by the parcel request client 42. Preferably, the pending requests are issued in priority order, thereby dynamically reflecting changes in the viewing frustum with minimum latency.

In various implementations of the parcel processing, each data parcel is independently processable by the client system 18, 20, which is enabled by the selection and server-side processing used to prepare a parcel for transmission, thus providing for on-demand real-time parcel processing and creation on the server side for streaming based on the client request and not only for pre-processed parcel creation for retrieval for streaming from the server. Thus, the system can use both pre-processed parcels on the server and on-demand real-time creation of such parcels on the server side for streaming to the client.

Figure 4:
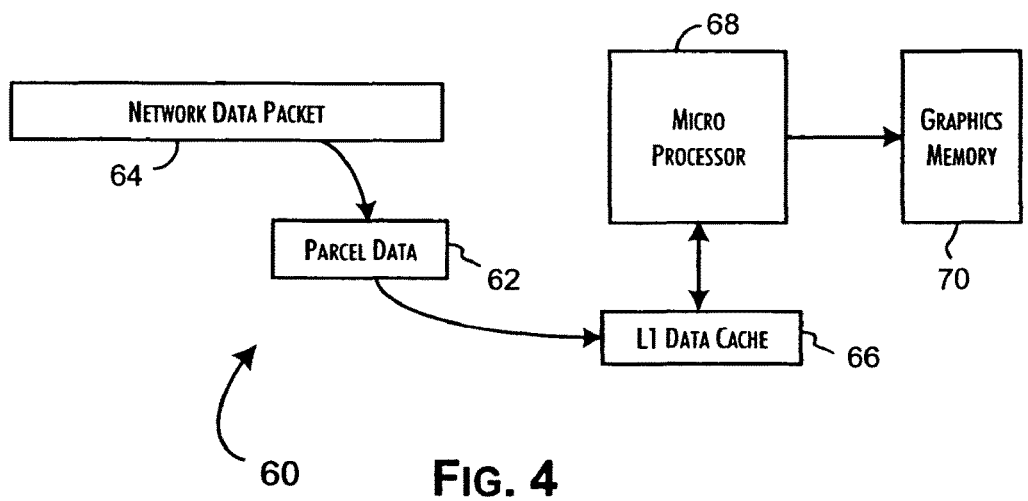
FIG. 4 provides a data block diagram illustrating an optimized client image block processing path constructed in accordance with a preferred embodiment of the present invention.

An optimal image parcel data flow 60, as configured for use in the preferred embodiments of the present invention, is shown in FIG. 4. Preferably, the TCP/IP network protocol is used to deliver image parcels to the clients 18, 20. For the preferred embodiments, where network bandwidth is limited or very limited, entire image parcels are preferably delivered in corresponding data packets. This preference maximizes data delivery while avoiding the substantial latency and processing overhead of managing image parcel data split over multiple network packets. Thus, a 2K byte compressed image parcel 62 is delivered as the data payload of a TCP/IP packet 64. Uncompressed, the 8K byte image parcel 62 is recognized as part of the present invention as being within the nominally smallest LI data cache 66 size of conventional microprocessors 68. By ensuring that an uncompressed image parcel fits within the LI cache, the texture map rendering algorithm can execute with minimum memory management overhead, thus optimally utilizing the processing capability of the microprocessor 68. Additionally, the writing of video data as a product of the rendering algorithm is uniform, thereby improving the apparent video stability of the display to the user.

Figure 5:
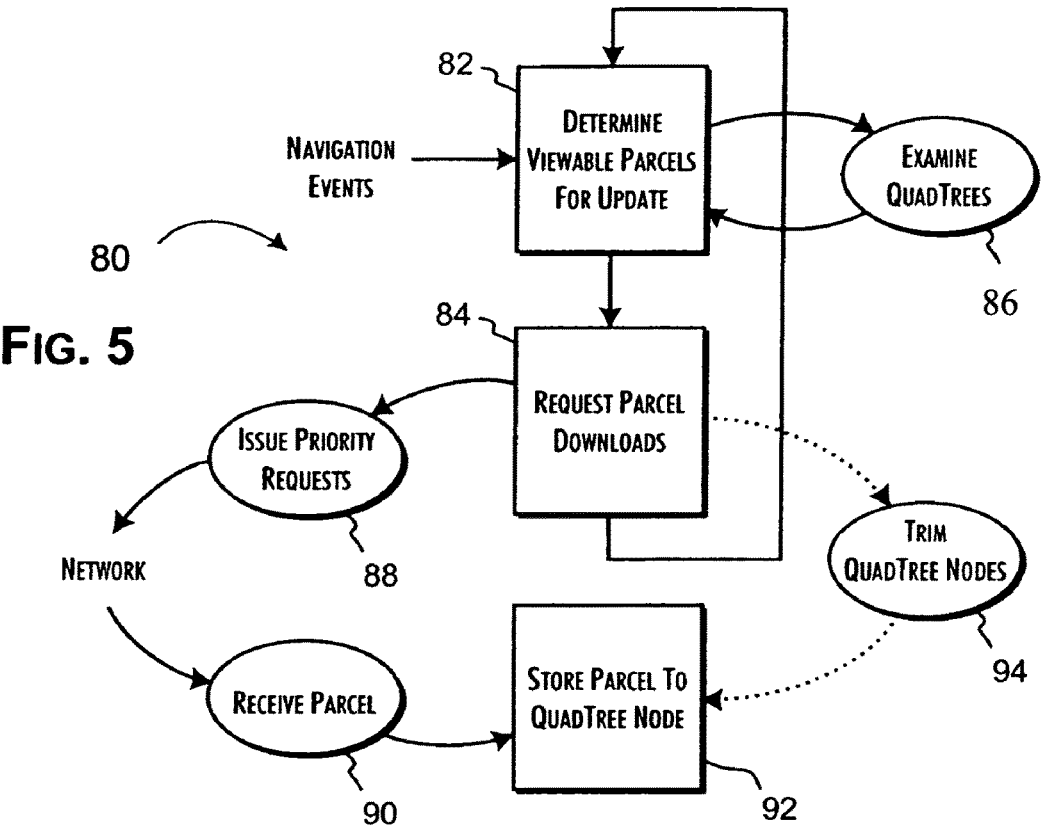
FIG. 5 is a process flow diagram showing a main processing thread implemented in a preferred embodiment of the present invention.

The client architecture 40 preferably executes in multiple process threads, with additional threads being utilized for individual network data request transactions. As shown in FIG. 5, an image parcel management process 80 implements a loop that determines image parcels subject to update 82 and creates corresponding image parcel download requests 84. Navigation events that alter the viewing frustum are considered in part to determine the current field of view. The quad tree data structures are examined 86 to identify viewable image parcels of higher resolution than currently available in the parcel data store 46.

A pool of image request threads is preferably utilized to manage the image parcel download operations. In the preferred embodiments of the present invention, a pool of four network request threads is utilized. The number of pool threads is determined as a balance between the available system resources and the network response latency, given the available bandwidth of the network connection. Empirically, for many wireless devices, four concurrent threads are able to support a relatively continuous delivery of image data parcels to the client 20 for display processing. As image parcels are progressively identified for download, a free request thread is employed to issue 88 a corresponding network request to the server 12, 22. When a network response is received, the corresponding thread recovers 90 the image parcel data. The received image parcel is then stored 92 in a corresponding quad-tree data structure node.

For small clients 20, the available memory for the parcel data store 46 is generally quite restricted. In order to make optimal use of the available memory, only currently viewable image parcels are subject to download. Where the size of the parcel data store 46 is not so restricted, this constraint can be relaxed. In either case, a memory management process 94 runs to monitor use of the parcel data store 46 and selectively remove image parcels to free memory for newly requested image parcels. Preferably, the memory management process 94 operates to preferentially remove image parcels that are the furthest from the current viewing frustum and that have the highest data structure depth. Preferably child node image parcels are always removed before a parent node parcel is removed.

Figure 6:
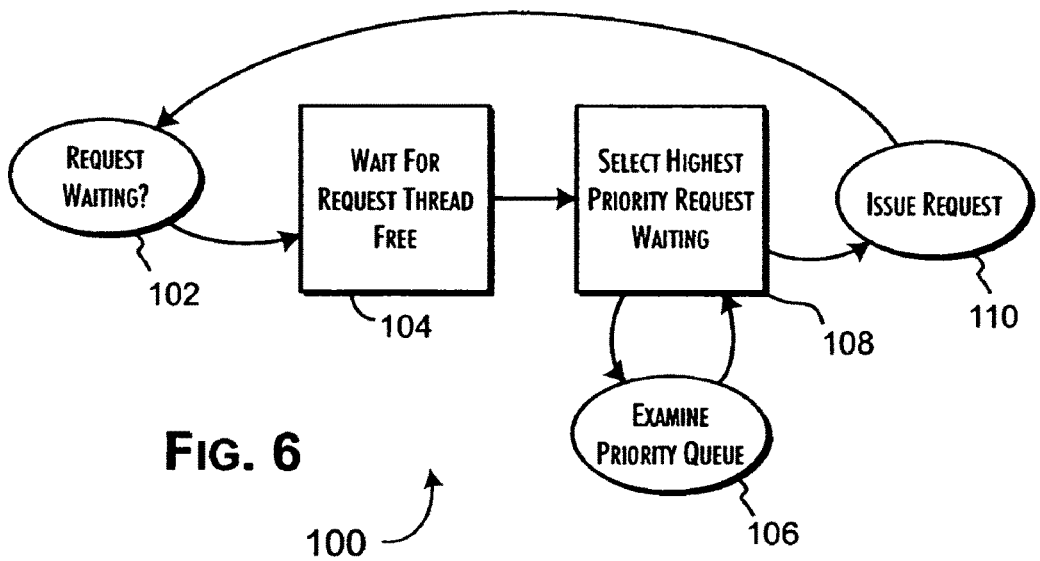
FIG. 6 provides a process flow diagram showing a network request thread implemented in a preferred embodiment of the present invention.

A preferred network request management process 100 is shown in FIG. 6. The process 100 waits 102 on the existence of a download request in the priority request queue 52. The process 100 then waits on a network request pool thread to become free 104. When a network request thread becomes available, the process 100 examines 106 all of the pending requests in the priority request queue 52 and selects 108 the request with the highest assigned priority. Thus, sequentially enqueued requests can be selectively issued out of order based on an independently assigned request priority. The request is then issued 110 and the request management process 100 leaves the request thread waiting on a network response.

FIG. 7 presents a preferred display management process 120. Event driven user navigation information is evaluated 122 to determine a current viewing frustum location and orientation within a three-dimensional space relative to the displayed image. An algorithmic priority selection 124 of a next image parcel to render is then performed. The selected image parcel is then rendered 126 to the display memory 70. The rendering operation preferably performs a texture map transform of the parcel data corresponding to the current viewing frustum location and orientation. The overlay data is then parsed or is pre-parsed to determine 128 whether the image coordinates of any overlay annotation correspond to the current image parcel location. If the coordinates match, the overlay annotation is rendered 130 to the video display memory 70. The process 120 then continues with the next selection 124 of an image parcel to render, subject to any change in the viewing frustum location and orientation.

Figure 9:
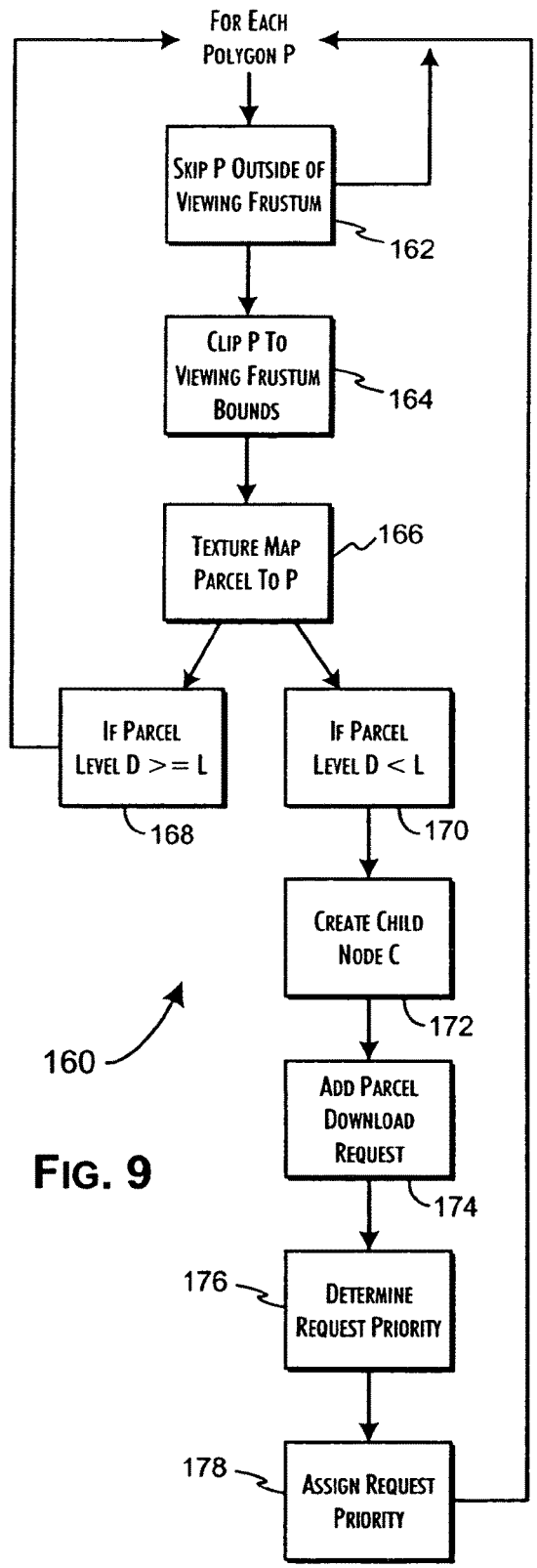
FIG. 9 provides a process flow diagram detailing the rendering and progressive prioritization of image parcel data download requests in accordance with a preferred embodiment of the present invention.
Figure 10:
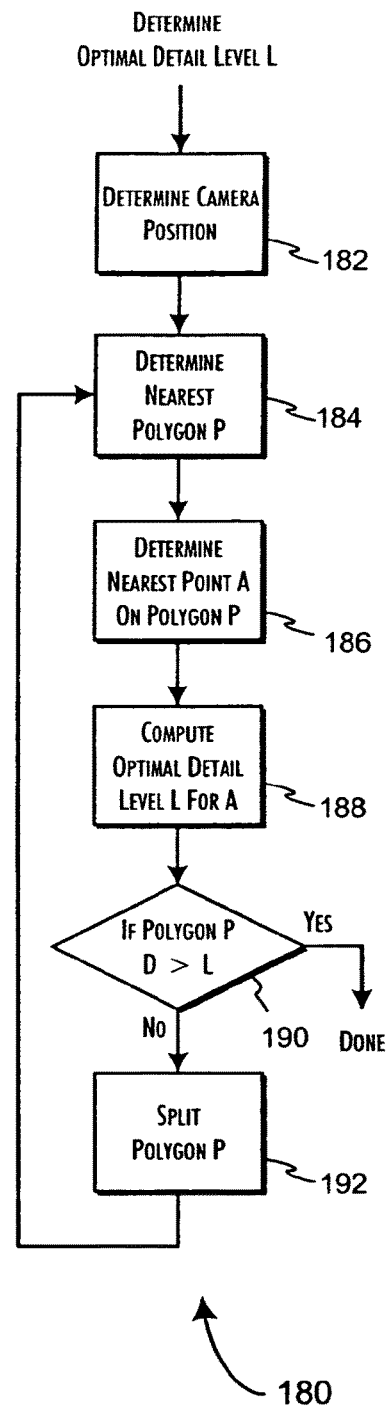
FIG. 10 provides a process flow diagram detailing the determination of an optimal detail level for image parcel presentation for a current viewing frustum in accordance with a preferred embodiment of the present invention.

A preferred implementation of the selection 124 and rendering 126 of image parcels in accordance with the present invention is detailed in FIGS. 8 through 10. Referring first to FIG. 8, any outstanding requests in the priority request queue 52 are preferably cleared 142 in response to a change in the viewing frustum location and orientation. The effective altitude of the viewing frustum and or the resolution of the client display are then used as a basis for determining an optimal level of detail L that will be displayed. The detail level L value operates as a floor defining the maximum resolution $K_L$ of image data that can be effectively viewed on the client display given the location and or orientation of the viewing frustum. Constraining image parcel requests to the resolution range $K_N$ to $K_L$, where $K_N$ is the lowest resolution derivative image stored by the network server 12, 22, prevents the download and processing of image parcels that cannot provide any perceptible improvement in the displayed image.

As part of the recursive evaluation of the optimal level of detail L, the image display space is progressively split 146 by four to one reductions into polygons. The quad-tree data structures holding existing image parcel data in the parcel data store 46 are concurrently traced 148 to establish a correspondence with the polygon map. Where the trace of a quad-tree data structure completes 150 to a node index of L for a polygon P, the node corresponding image parcel is associated with polygon P. The polygon P will not be further subdivided and no higher resolution image parcels will be requested for any portion of the image within the area represented by polygon P. Where the trace reaches a maximum node index of D for a polygon P' 152, where N≤D<L and N is the index of the lowest resolution derivative image stored by the network server 12, 22, the image parcel associated with the node is associated with the polygon P'. This polygon P' will be subject to further subdivision and progressive requests for image parcels of higher resolution up to the detail level L.

Referring now to FIG. 9, a display image is then rendered 160 beginning with the maximum depth polygons previously found. Iterating over the set of maximum depth polygons, any polygons outside of the viewing frustum are skipped 162. Polygons that are at least partially visible are clipped to the applicable bounds of the viewing frustum 164. The polygon corresponding image parcel data is then texture mapped 166 into the polygon corresponding coordinates of the video memory 70. If the node index depth of the rendered image parcel is at least equal to the prior determined optimal detail level L 168, the iteration over the polygons P continues.

Where the node index depth is less than the optimal detail level L 170, the polygon P' is subdivided into four polygons and correspondingly represented by the creation of four child nodes within the associated quad-tree data structure 172. Four image parcel download requests are then created 174.

The download priority associated with each request is determined 176 by execution of a function S that operates on a 2D polygon argument P and returns a real number representing the request priority. The function argument P is a list of real (x, y) coordinates of the vertices of the current polygon in screen coordinates after being clipped to fit within the current viewing frustum. That is, the function S works over general polygons in a two-dimensional space, whose vertices are specified by the series $\{(x(1),y(1)),(x(2),y(2)), \ldots, (x(n),y(n))\}$. The argument P vertices sent to S represent the position of the vertices composing each of the polygons, after being clipping to the viewing frustum, viewable within the display space having the fixed resolution [xRes, yRes]. Thus, the clipped polygons are all within the rectangle [O, xRes]×[O, yRes].

In execution of the function S, each of the P coordinates is first transformed by linear mapping of the screen coordinate space to the square $[-1,1]\times[-1,1]$ by the operation $x(i):=(x(i)-xRes/2)/(xRes/2)$; $y(i)=(y(i)-yRes/2)/(yRes/2)$. The x and y coordinate values of each vertex (x(i),y(i)) for i=1 to n) are then transformed by the function $T(a)=sgn(a)*pow(|a|, d)$, where the control parameter d is a constant in the range (0,1], or equivalently the interval $0<d\leq 1$. The function S then returns a real value that is equal to the area covered by the argument polygon P vertices subject to the applied coordinate transformation. Thus, the accumulated priority for any image parcel pending download is the sum of the values of returned by the function S for each of the viewable polygons that require some part of the image parcel as the source data for texture map rendering of the polygon. The priority operation of the request queue 52 is such that download requests will be issued preferentially for image parcels with the largest priority value.

In accordance with the preferred embodiments of the present invention, the value of the control parameter d can be adjusted to ultimately affect the behavior of the function S in determining the download request priority. In general, image parcels with lower resolution levels will accumulate greater priority values due to the larger number of polygons that may use a given low resolution image parcel as a rendering data source. Such lower resolution image parcels are therefore more likely to be preferentially downloaded. In accordance with the present invention, this generally assures that a complete image of at least low resolution will be available for rendering.

The control parameter d, as applied in execution of the function S, well as the area distortion produced by the projection transform also influences the value returned by the function S such that relatively higher-resolution image parcels near the image view point will occasionally achieve a higher priority than relatively remote and partially viewed image parcels of lower resolution. Using values smaller than 1 for the control parameter d results in requests with a higher priority for parcels covering areas near the focal point of the viewer, which is presumed to be the center point of the display space, relative to requests for parcels further from the center point in absolute terms and of the same resolution depth D. Thus, in accordance with the present invention, the priority assigned to image parcel requests effectively influences the order of requests based on the relative contribution of the image parcel data to the total display quality of the image. Empirically, a value of 0.35 for the control parameter d for small screen devices, such as PDAs and webphones has been found to produce desirable results.

The computed priorities of each of the four newly created image parcel requests are then assigned 178 and the requests are enqueued in the priority request queue 52. The next polygon P is then considered in the loop of the image parcel rendering process 160.

The preferred algorithm 180 for determining the detail level L value for a given viewing frustum is shown in FIG. 10. In accordance with the present invention, the optimal detail level L is effectively the limit at which the resolution of image parcel data functionally exceeds the resolution of the client display. Preferably, to determine the optimal detail level L, the viewpoint or camera position of the viewing frustum is determined 182 relative to the displayed image. A nearest polygon P of depth D is then determined 184 from the effective altitude and attitude of the viewpoint. The nearest point A of the polygon P is then determined 186. The point A may be within the interior or an edge of the polygon P, though most likely be located at a vertex of the polygon P.

The optimum level of detail L at point A is then computed 188 as the base-4 logarithm of the number of pixels on the screen that would be covered by a single pixel from an image parcel of the lowest resolution $K_{-N}$ image, which is the quad-tree root image and corresponds to an image area covering the entire image map. The point A optimal detail level L is preferably computed analytically from the local value of the Jacobian of the projective transform used to transform the three dimensional image coordinate space to screen coordinates, evaluated at the point A.

Where the depth D of the polygon P is greater than the depth of the computed optimal level of detail L, the detail level L is taken as the optimal detail level L 190. Thus, through the process 140, an image parcel or corresponding section of the closest resolution image parcel associated with a parent node in the quad-tree data structure relative to the depth level L will be used as the texture for rendering the polygon P. Conversely, if the depth D is less than that of the optimal detail level L, the polygon P is effectively split into quadrants and the optimal level of detail is reevaluated. The process 180 thus continues iteratively until the optimal detail level L is found.

Thus, a system and methods of optimally presenting image data on client systems with potentially limited processing performance, resources, and communications bandwidth have been described. While the present invention has been described particularly with reference to the communications and display of geographic image data, the present invention is equally applicable to the efficient communications and display of other high resolution information.

In the process implemented by the system described above, data parcels may be selected for sequential transmission based on a prioritization of the importance of the data contained. The criteria for the importance of a particular data parcel may be defined as suitable for particular applications and may directly relate to the presentation of image quality, provision of a textual overlay of a low-quality image to quickly provide a navigational orientation, or the addition of topography information at a rate or timing different from the rate of image quality improvement. Thus, image data layers reflecting navigational cues, text overlays, and topography can be composed into data packets for transmission subject to prioritizations set by the server alone and not based on the client system and interactively influenced by the actions and commands provided by the user of the client system. However, this also may be influenced based on the nature and type of the client system, and interactively influenced by the actions and commands provided by the user of the client system (FIG. 5).

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A method of retrieving large-scale images over wireless network communications channel for display on a wireless portable device, the method comprising:

issuing a first request from the wireless portable device to a remote computer, the first request being for a first update data parcel, the first update data parcel and a second update data parcel being selected based on a same operator controlled image viewpoint on the wireless portable device relative to a predetermined image, the first update data parcel and the second update data parcel comprising data that is used to generate a display on the wireless portable device for the same operator controlled viewpoint;

processing source image data of the predetermined image to obtain a series K1-N of derivative images of progressively lower detail level, the step of processing being performed on the remote computer, wherein the step of processing comprises subdividing image Ko of the series into a regular array of data parcels that includes the first and the second update data parcels, wherein the step of processing further comprises compressing each data parcel of the regular array of data parcels, and wherein the step of processing further comprises storing each data parcel of the regular array of data parcels on the remote computer such that a data parcel of the regular array of data parcels can he located by specification of a set of (KD, X, Y) values that represents a data set detail level index D and image array coordinates;

receiving the first update data parcel sent in response to the first request from the remote computer over the wireless network communications channel, wherein the step of receiving the first update data parcel is performed by the wireless portable device;

displaying an image on the wireless portable device using the first update data parcel received by the wireless portable device, wherein the first update data parcel uniquely forms a discrete portion of the predetermined image with respect to the same operator controlled image viewpoint;

issuing a second request from the wireless portable device to the remote computer, the second request being for a the second update data parcel; and receiving the second update data parcel sent in response to the second request from the remote computer over the wireless network communications channel, wherein the step of receiving the second update data parcel is performed by the wireless portable device;

wherein the first and second update data parcels are requested and received through a local embedded server, the local embedded server using a local image repository to store image parcels, the local embedded server providing access to at least some image parcels;

wherein the wireless portable device issues data parcel requests according to assigned priority values of the data parcel requests, the method further comprising determining the assigned priority values based on image detail level of the data parcels selected for same operator controlled image viewpoint.

2. The method of claim 1, wherein the wireless portable device is selected from the group consisting of a mobile computer system, a cellular computer system, a handheld computer system, a personal digital assistants, and an internet-capable digital phone.

3. The method of claim 1, wherein the wireless network communications channel is a packetized wireless network communications channel, and wherein the first update data parcel is received by the wireless portable device from the packetized wireless network communications channel in one or more data packets.

4. The method of claim 1, wherein the wireless network communications channel is a packetized wireless network communications channel, the method further comprising transmitting the data parcels of the regular array of data parcels from the remote computer to the wireless portable device in compressed form obtained in the step of processing.

5. The method of claim 4, wherein the first update data parcel comprises pixel data in a fixed size array independent of pixel resolution of the predetermined image.

6. The method of claim 1, wherein the wireless portable device issues data parcel requests according to prioritization from among a plurality of parcels selected for same operator controlled image viewpoint.

7. The method of claim 6, wherein there is a non-empty overlap area between areas of the first and the second data parcels, the second data parcel has detail level greater than the first data parcel, and the first data parcel is retrieved earlier than the second data parcel according to the prioritization, and at least a portion of the first data parcel is displayed in the non-empty overlap area before any data from the second data parcel, whereby enabling local enhancement of detail level in the overlap area.

8. The method of claim 1, wherein the step of issuing the first request and the step of issuing the second request occur at least in part concurrently, and the step of receiving the first update data parcel and the step of receiving the second update data parcel occur at least in part concurrently, thereby enabling efficient use of network bandwidth in conditions of network latency; and wherein number of concurrently pending requests for data parcels for display on the wireless portable device at any time is limited to a pending requests maximum number.

9. A wireless portable device for displaying large-scale images retrieved over a wireless network channel, the wireless portable device comprising:

a display of defined screen resolution for displaying a defined image;

a memory providing for storage of a plurality of image data parcels displayable over respective portions of a mesh corresponding to the defined image;

a wireless network channel interface supporting retrieval of a first defined data parcel of the defined image and a second defined data parcel of the defined image over the wireless network channel;

a processor coupled to the display, the memory, and the wireless network channel interface, the processor being configured to select the first and the second defined data parcels for a same operator controlled viewpoint, retrieve the first defined data parcel via the wireless network channel interface, store the first defined data parcel in the memory, and render the first defined data parcel over a discrete portion of the mesh according to the same operator controlled image viewpoint to provide for detail level enhancement of the defined image on the display;

a local embedded server, the local embedded server using a local image repository to store image parcels, the local embedded server providing access to at least some image parcels, the retrieval of data parcels occurs through the local embedded server;

wherein the wireless portable device is coupled over the wireless network channel to a remote computer;

wherein the remote computer is configured to store a regular arrays of data parcels resulting from processing of source image data of a predetermined image to obtain a series K1-N of derivative images of progressively lower detail level, wherein the processing of the source image data comprises subdividing each respective image K of the series into a the regular array of data parcels, the regular arrays of data parcels comprising the first defined data parcel and the second defined data parcel, wherein the processing of the source image data further comprises compressing each data parcel of the regular array of data parcels, and wherein the processing of the source image data further comprises storing each data parcel of the regular array on the remote computer such that a data parcel of the regular array of data parcels can be located by specification of a set of ($K_D$, X, Y) values that represents data set detail level index D and image array coordinates;

wherein the processor is further configured to retrieve data parcels according to assigned priority values of the data parcels selected for the same operator controlled image viewpoint and to determine the assigned priority values based on image detail level of the data parcels.

10. The wireless portable device of claim 9, wherein selection of the defined data parcels is limited so that image detail level of selected defined data parcels is less than or equal to the defined screen resolution.

11. The wireless portable device of claim 9, wherein the processor is further configured to define the same operator controlled image viewpoint relative to the defined image in response to user navigation commands provided by a user, and to prioritize retrieval of the data parcels from among a plurality of parcels selected for the same operator controlled image viewpoint.

12. The wireless portable device of claim 9, wherein the wireless portable device includes functionality of at least one type of wireless portable devices selected from the group consisting of mobile computer systems, cellular computer systems, handheld computer systems, personal digital assistants, and internet-capable digital phones.

13. The wireless portable device of claim 9, wherein there is a non-empty overlap area between areas of the first and the second defined data parcels, the second defined data parcel has level of details greater than the first defined data parcel, and the processor is configured to prioritize retrieval and display for the image viewpoint such that the first defined data parcel is at least partially displayed in the non-empty overlap area before the second defined data parcel, therefore enabling local enhancement of detail level.

14. The wireless portable device of claim 9, wherein retrieval of the first defined data parcel and retrieval of the second defined data parcel by the processor occur at least in part concurrently, thereby enabling efficient use of network bandwidth in conditions of network latency; and wherein number of concurrently pending retrievals of data parcels by the processor for the display is limited to a pending retrievals maximum number.

* * * * *